United States Patent Office 3,385,313
Patented May 28, 1968

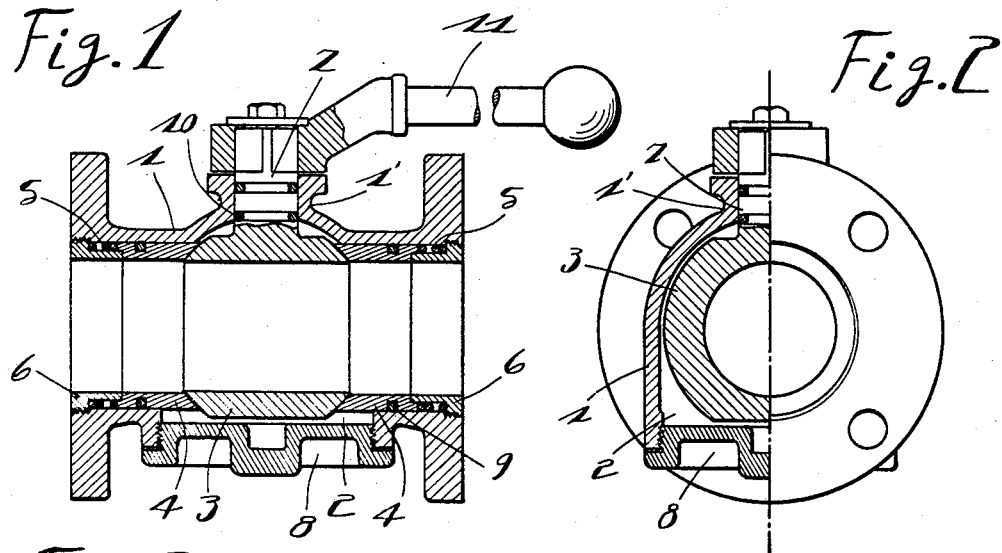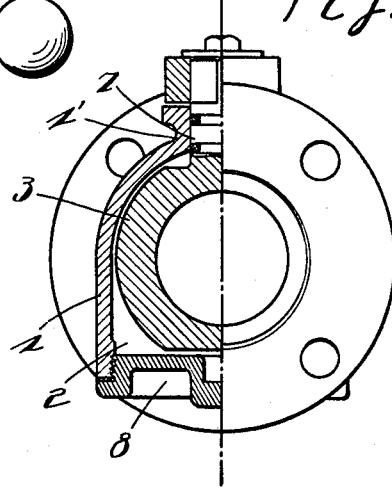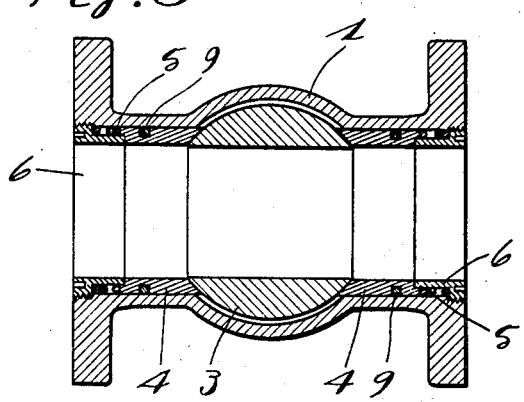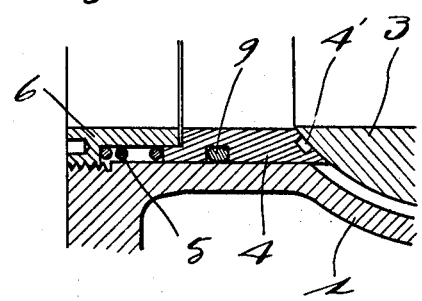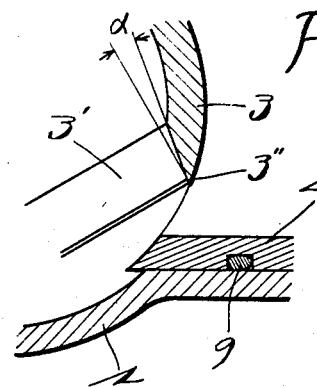

3,385,313
BALL VALVE
Masao Okada, 16 7-chome, Senbondori, Nishinariku,
Osaka, Japan
Filed Jan. 3, 1966, Ser. No. 518,379
5 Claims. (Cl. 137—315)

ABSTRACT OF THE DISCLOSURE

A ball valve is provided in which the valve casing comprises a spindle sleeve and flow passages which are integral and thus permanently related in which the ball is supported solely by the single spindle sleeve and spring pressed valve seat bushes; in which the valve seat bushes and parts associated with the latter are removable outwardly through the flow passages of the valve; and in which the valve ball is removable through a window which is provided with a closure. Preferred forms provide a passage of uniform cross-section through the valve when open; sealing grooves in the spherical surfaces that communicate with the flow passage while the valve is being opened and closed and cutting provisions for coping with foreign matter in the flowing stream.

The present invention relates to a ball valve which assures long lasting service free of leakage, and more particularly to a ball valve comprising a combination of specially cooperating elements including a unitary ball valve member, a housing comprising a unitary casing, and cooperating parts. The unitary ball valve member includes a ball element having a flow passage therethrough and a valve spindle integral therewith and extending at right angles to the direction of said flow passage. The valve housing includes a unitary casing for supporting all the rest of the parts; said casing having a central space therein for housing said ball element, a pair of cylindrical longitudinally aligned flow passages communicating with said central space in alignment with the flow passage through the ball element, a sleeve extending from the central space at right angles to the direction of said flow passages and in which the valve spindle is rotatably received, and a window opposite the sleeve and sized to permit insertion and withdrawal of the ball valve member therethrough. The valve housing also includes a closure for the window and a pair of cylindrical valve seat bushes slidably mounted in the flow passage of the casing and removable outwardly therethrough and sealingly embracing the ball element; spring means for pressing the valve seat bushings toward each other, said spring means comprising gland bushes mounted at the outer ends of the flow passages of the casing and having spring isolating portions telescopically engaged within the outer end portions of the valve seat bushes, and spring elements embracing such spring isolating portions and compressed between the gland bushes and the valve seat bushes; the spring means being removable through the outer ends of the flow passages of the casing to permit removal of the valve seat bushes therethrough; the valve further comprising radially acting sealing means between the valve spindle and the sleeve, the valve seat bushes thus being maintained in contact with the valve ball under constant pressure and, with the sleeve, constituting the sole support for said ball valve member.

In ball valves of the conventional types where a part of valve casing serves as the valve seat, a ring packing of elastic material is necessarily inserted between the valve ball and valve seat to keep the two metallic members water-tight. The ring packing to be put on the valve seat, however, requires a split (not integral) structure of valve, which in turn requires a substantial difficulty in centering the ball valve and seat when assembled. An unsatisfactory centering of the valve and seat inevitably creates such a defective contact of ball and packing as to quicken the wearing of the packing and cause early leakage, thus the life of valve shortened.

The above-described fault of conventional-type ball valves is attributed to the necessity of packing between the valve ball and seat.

A major object of the invention is to obtain a ball valve whose metallic ball and seat are in direct contact without any intermediary of packing for longer durability free of leakage; the valve ball and seat being of simple form to facilitate their finishing, and being combined in a manner to facilitate their centering.

In the accompanying drawings:

FIG. 1 is a vertically sectioned front view of a ball valve in accordance with one embodiment of the invention.

FIG. 2 is a side elevation, partially sectioned, of FIG. 1.

FIG. 3 is a horizontally sectioned plan view of FIG. 1.

FIG. 4 is a enlarged plan view of a valve seat provided with an annular channel in contact with the valve ball in accordance with a second embodiment of the invention.

FIG. 5 is an enlarged plan view of valve ball and seat constructed to cope with foreign matters contained in the liquid, in accordance with a third embodiment of the invention.

The ball valve in accordance with the present invention comprises a valve casing 1 not split but integral, a valve ball 3 made integral with a valve spindle 7, a pair of bushes 4 to serve as valve seat, and a pair of gland bushes 6 to hold the bushes 4 in contact with the ball member 3 by the intermediary of springs 5. The valve casing 1 is provided integrally with a sleeve 1' to receive the valve spindle 7 and a window 2 to insert the valve ball 3 through. The valve ball 3 is inserted into its position without any procedure of centering in the axial direction of spindle 7, but is supported in position by the bushes 4 in direct contact exclusive of any intermediary packing between them. The valve seat bushes 4 are inserted axially of the pipe line, and are always maintained in sufficiently close contact with the valve ball 3 by the force of springs 5 provided on the outside in relation to the gland bushes 6. A cover 8 is provided on the window 2 of casing 1. The numerals 9 and 10 indicate O-rings, while the numeral 11 indicates a handle.

The ball valve in accordance with the invention requires no assembly aligning of casing 1 because it is made integral. The valve ball 3 is easily finished into spherical form because it is integral with the valve spindle 7, thus the precise manufacture of the valve ball is facilitated. The valve ball 3 presents no problem of centering with the valve seat, because it is inserted into its position in such manner that its valve spindle 7 is received loosely into the sleeve 1' without any axial centering and it is directly supported at the both sides by the valve seat consisting of bushes 4 which are inserted in the longitudinal direction of pipe line; thus the valve ball 3 and seat 4 are axially centered in an easy and precise manner.

If, however, the valve ball 3 were provided with another spindle at the bottom to fix the position of valve ball in the axial direction of spindle, centering and maintenance of sealing of the valve ball 3 and the valve seat bushes 4 would be difficult.

In accordance with the present invention, the valve ball 3 is not only centered to the valve seat bushes 4 in a sufficiently easy manner when assembled, but also held in sufficiently close contact with the valve seat bushes 4 all through the operation of pipe line as the valve seat bushes 4 are pressed to the valve ball 3 by the springs 5 in relation to the gland bushes 6. Thus a ball valve of metalto-metal contact type is made available in simple form and structure by the present invention.

The inventor actually applied a ball valve of this invention to a pipe line for kerosene (which does not permit of any conventional type ball valve with a packing member between the ball and seat), and this resulted in no leakage even after 6 months' continuous operation.

FIG. 4 illustrates a modification particularly desirable for valves for handling gasoline and other liquids of substantially low viscosity even when constructed with but usual manufacture precision. This result is achieved by providing an annular channel 4' on the surface of each valve seat bush 4 in contact with the adjacent surface of valve ball 3, as shown in FIG. 4. The annular channel or groove so located is put into communication with the flow passage through the ball valve member as the latter is rotated between the open and closed positions of the valve, but is sealed by the ball surface when the valve is fully open or fully closed, and prevents any leakage probably because of the sealing effect attributed to gasoline or other liquids filled into it by such communication.

The ball valve of the invention facilitates easy finishing, in other words, precise finishing, of the valve ball, casing, seat bushes and other parts because of their simple structure. And even if they are not finished so very precisely, the valve ball and seat are always maintained in such close contact with each other as to exclude the possibility of leakage over a long period of duty, for they are centered with each other in a very simple and satisfactory manner in that the valve ball 3 is put into its position through the window 2 in a manner to insert the spindle 7 into the sleeve 1' and then the valve ball 3 is embraced by the pair of bushes 4 which are inserted longitudinally of the valve passage.

The ball valve of the present invention may advantageously be provided with an edge 3" sharpened by internal beveling at a given angle $\alpha$ at the liquid port 3' of ball 3, as shown in FIG. 5, to adapt it to cope with foreign matters contained in the liquid such as in the sanitary sewerage system. Suppose some foreign matter, say paper, cloth or a wooden piece, is just passing the port 3' of valve ball 3 when the valve is about to be closed; the foreign matter is cut apart between the sharpened edge 3" and counter edge of bush 4 so that the valve is closed quite satisfactorily without any foreign matter staying in between or without any damage caused by the foreign matter on the contact surfaces of valve ball and seat. The ball valve of the invention is therefore especially useful to pipes in sanitary sewerage system or in pulp plants.

There will be no special technical difficulties to provide a plurality of passages to make a three-way, four-way or other multi-way valve while the valve casing remains integral in accordance with the present invention.

What I claim:

1. A flow valve comprising, in combination,
    (A) a ball valve member including
        (1) a ball element having a flow passage therethrough and
        (2) a valve spindle integral with said ball element and extending at right angles to said flow passage;
    (B) a valve housing including:
        (1) a unitary casing having
            (a) a central space therein for housing said ball element,
            (b) a pair of cylindrical longitudinally aligned flow passages communicating with said central space in alignment with the flow passage through said ball element,
            (c) a sleeve extending from said central space at right angles to said flow passages and in which said valve spindle is rotatably mounted, and
            (d) a window at the side of the casing opposite said sleeve and sized to permit insertion and withdrawal of said ball valve member therethrough,
        (2) a closure for said window,
        (3) a pair of cylindrical valve seat bushes slidably mounted, respectively, in said cylindrical longitudinally aligned flow passages, removable outwardly therethrough, and having spherically concave inner ends seating against and sealingly embracing said ball element,
        (4) spring means engaging the outer ends of each of said valve seat bushes for pressing the same toward each other to embrace and center said ball member between them, said spring means comprising
            (a) gland bushes mounted at the outer ends of said aligned flow passages outwardly of said valve seat bushes, respectively, and having spring isolating portions telescopically engaged within the outer end portions of said valve seat bushes, and
            (b) spring elements embracing the spring isolating portions of said gland bushes and compressed between said gland bushes and said valve seat bushes and isolated thereby from the fluid passages therethrough,
        and said spring means being removable through the outer ends of said aligned flow passages to permit removal of said valve seat bushes therethrough,
    (C) radially acting sealing means between said valve spindle and said sleeve,
    (D) said sleeve and said valve seat bushes constituting the sole support for said ball valve member.

2. A flow valve as claimed in claim 1, wherein the passages through said valve ball member, said valve seat bushes, and said gland bushes are all coaxial and of substantially the same unobstructed cylindrical diameter in the open position of the valve.

3. A flow valve as claimed in claim 1, and in which
    (E) said valve seat bushes are provided with annular grooves in their spherically concave inner ends, which are put into communication with the flow passage through said ball valve member as the latter is rotated between the open and closed positions of the valve.

4. A flow valve as claimed in claim 1, wherein said valve seat bushes and ball member are of metal and are sealingly interengaged without the interposition of any other material between them.

5. A flow valve as claimed in claim 1, and in which edges of the ball member bounding the flow passages therethrough are sharpened by internal beveling to serve as cutting blades thereat.

References Cited

UNITED STATES PATENTS

| 1,488,296 | 3/1924 | Stevens | 251—174 |
| 1,738,450 | 12/1929 | Ryan | 251—159 |
| 1,941,839 | 1/1934 | Johansson | 251—170 |
| 2,661,926 | 12/1953 | Resek | 257—159 XR |
| 3,014,690 | 12/1961 | Boteler | 251—174 |
| 3,037,738 | 6/1962 | Jackson | 251—174 XR |
| 3,164,362 | 1/1965 | Lavigueur | 251—174 |
| 3,226,082 | 12/1965 | Gulick | 251—315 XR |

FOREIGN PATENTS

| 23,939 | 9/1921 | France. |
| | | Addition to 529,006. |

WILLIAM F. O'DEA, *Primary Examiner.*

H. WEAKLEY, *Assistant Examiner.*